United States Patent
Oshiro et al.

(10) Patent No.: US 6,748,798 B2
(45) Date of Patent: Jun. 15, 2004

(54) METHOD AND APPARATUS FOR DETECTING DECREASE IN TIRE AIR-PRESSURE, AND PROGRAM FOR JUDGING DECOMPRESSION OF TIRE

(75) Inventors: Yuji Oshiro, Kobe (JP); Minao Yanase, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 10/353,969

(22) Filed: Jan. 30, 2003

(65) Prior Publication Data

US 2003/0140688 A1 Jul. 31, 2003

(30) Foreign Application Priority Data

Jan. 30, 2002 (JP) ........................ 2002-021586

(51) Int. Cl.⁷ .................... G01M 17/02; B60C 23/02
(52) U.S. Cl. ............... 73/146; 73/146.2; 340/441; 340/442; 340/444
(58) Field of Search ............... 73/146, 146.2; 340/441, 442, 444

(56) References Cited

U.S. PATENT DOCUMENTS

| | | | |
|---|---|---|---|
| 3,691,524 A | | 9/1972 | Frost et al. |
| 5,760,682 A | | 6/1998 | Liu et al. |
| 6,034,595 A | * | 3/2000 | Yanase ........................ 340/444 |
| 6,060,983 A | * | 5/2000 | Yanase et al. ............... 340/442 |
| 6,137,400 A | * | 10/2000 | Yanase et al. ............... 340/442 |
| 6,317,667 B1 | * | 11/2001 | Oshiro ........................ 701/29 |
| 6,323,765 B1 | * | 11/2001 | Horie et al. ................. 340/442 |
| 6,339,957 B1 | * | 1/2002 | Yanase et al. ................. 73/146 |
| 6,396,396 B2 | * | 5/2002 | Oshiro et al. ............... 340/442 |
| 6,420,966 B2 | * | 7/2002 | Sugisawa ..................... 340/442 |
| 6,501,373 B2 | * | 12/2002 | Kitano ........................ 340/444 |
| 6,504,475 B2 | * | 1/2003 | Sugisawa ..................... 340/444 |
| 6,604,040 B2 | * | 8/2003 | Kawasaki et al. ........... 701/80 |
| 6,615,650 B2 | * | 9/2003 | Mahner ....................... 73/146 |

FOREIGN PATENT DOCUMENTS

| | | |
|---|---|---|
| EP | 0 650 856 A1 | 11/1995 |
| JP | 7-47820 A | 2/1995 |
| JP | 7-52621 A | 2/1995 |

* cited by examiner

*Primary Examiner*—Edward Lefkowitz
*Assistant Examiner*—Andre Allen
(74) *Attorney, Agent, or Firm*—Birch, Stewart, Kolasch & Birch, LLP

(57) ABSTRACT

A method for detecting decrease in tire air-pressure including the steps of: detecting rotational information of the respective tires; storing rotational information; detecting whether the vehicle is running on a flat road or not; detecting whether the vehicle is accelerating or decelerating; comparing rotational information of both front wheels with rotational information of both rear wheels when it has been determined that the vehicle is running on a flat road and that the vehicle is neither accelerating nor decelerating; and judging simultaneous decompression of both front wheel tires or simultaneous decompression of both rear wheel tires on the basis of a relationship between a value obtained through comparison of the rotational information of both front wheels and both rear wheels and a specified threshold. It is possible to judge simultaneous decompression of both front wheel tires or both rear wheel tires when employing the present invention.

6 Claims, 5 Drawing Sheets

METHOD AND APPARATUS FOR DETECTING DECREASE IN TIRE AIR-PRESSURE, AND PROGRAM FOR JUDGING DECOMPRESSION OF TIRE

BACKGROUND OF THE INVENTION

The present invention relates to a method and apparatus for detecting decrease in tire air-pressure, and a program for judging decompression of a tire. More particularly, it relates to a method and apparatus for detecting decrease in tire air-pressure, and a program for judging decompression of a tire with which it is possible to detect simultaneous decompression of two wheel tires of both front wheels or rear wheels.

An apparatus for detecting decrease in tire air-pressure (DWS) in which decompression of a tire is detected on the basis of rotational (wheel speed) information of four wheel tires attached to a vehicle is conventionally known. Such an apparatus employs a theory that a rotational velocity or a rotational angular velocity of a decompressed tire is increased when compared to remaining normal tires owing to a decrease in outer diameter (dynamic load radius of the tire) from that of a tire of normal internal air-pressure. In a method for detecting decrease in internal pressure on the basis of a relative difference in rotational angular velocities of tires (reference should be made to Japanese Unexamined Patent Publication No. 305011/1988), $$DEL = \{(F1+F4)/2 - (F2+F3)/2\}/\{(F1+F2+F3+F4)/4\} \times 100 (\%)$$

is employed as a judged value DEL. Here, F1 to F4 denote rotational angular velocities of a front left tire, a front right tire, a rear left tire and a rear right tire, respectively.

However, since decompression is judged on the basis of a difference in sums of rotational angular velocities of the four wheels which are respectively located diagonally with respect to each other, it is impossible to simultaneously detect decompression of both front wheels or both rear wheels. It therefore exists the danger that fuel consumption is worsened through increase in rolling resistance of the tire and that a burst might be caused upon continuing running without being aware of decompression.

SUMMARY OF THE INVENTION

In view of the above facts, it is an object of the present invention to provide a method and apparatus for detecting decrease in tire air-pressure, and a program for judging decompression of a tire with which it is possible to detect simultaneous decompression of both front wheels or both rear wheels.

In accordance with a first aspect of the present invention, there is provided a method for detecting decrease in tire air-pressure, which detects decrease in internal pressure of a tire on the basis of rotational information obtained from tires attached to a vehicle, the method including the steps of: detecting rotational information of the respective tires; storing rotational information of the respective tires; detecting whether the vehicle is running on a flat road or not; detecting whether the vehicle is accelerating or decelerating; comparing rotational information of both front wheels with rotational information of both rear wheels when it has been determined that the vehicle is running on a flat road and that the vehicle is neither accelerating nor decelerating; and judging simultaneous decompression of both front wheel tires or simultaneous decompression of both rear wheel tires on the basis of a relationship between a value obtained through comparison of the rotational information of both front wheels and both rear wheels and a specified threshold.

In accordance with a second aspect of the present invention, there is provided an apparatus for detecting decrease in tire air-pressure, which detects decrease in internal pressure of a tire on the basis of rotational information obtained from tires attached to a vehicle, the apparatus including: rotational information detecting means which detect rotational information of the respective tires; a rotational information storing means which stores the rotational information of the respective tires; a running condition detection means which detects whether the vehicle is running on a flat road or not; an acceleration/deceleration detection means which detects whether the vehicle is accelerating or decelerating; a comparison means which compares rotational information of both front wheels with rotational information of both rear wheels when it has been determined that the vehicle is running on a flat road and that the vehicle is neither accelerating nor decelerating; and a decompression judging means which judges simultaneous decompression of both front wheel tires or simultaneous decompression of both rear wheel tires on the basis of a relationship between a value obtained through comparison of the rotational information of both front wheels and both rear wheels and a specified threshold.

In accordance with a third aspect of the present invention, there is provided a program for judging decompression of a tire, in which for judging decrease in tire air-pressure of a tire, a computer is made to function as a rotational information storing means which stores the rotational information of the respective tires; a running condition detection means which detects whether the vehicle is running on a flat road or not; an acceleration/deceleration detection means which detects whether the vehicle is accelerating or decelerating; a comparison means which compares rotational information of both front wheels with rotational information of both rear wheels when it has been determined that the vehicle is running on a flat road and that the vehicle is neither accelerating nor decelerating; and a decompression judging means which judges simultaneous decompression of both front wheel tires or simultaneous decompression of both rear wheel tires on the basis of a relationship between a value obtained through comparison of the rotational information of both front wheels and both rear wheels and a specified threshold.

DETAILED DESCRIPTION

The method and apparatus for detecting decrease in tire air-pressure, and the program for judging decompression of a tire according to the present invention will now be explained on the basis of the accompanying drawings.

Figure 1:
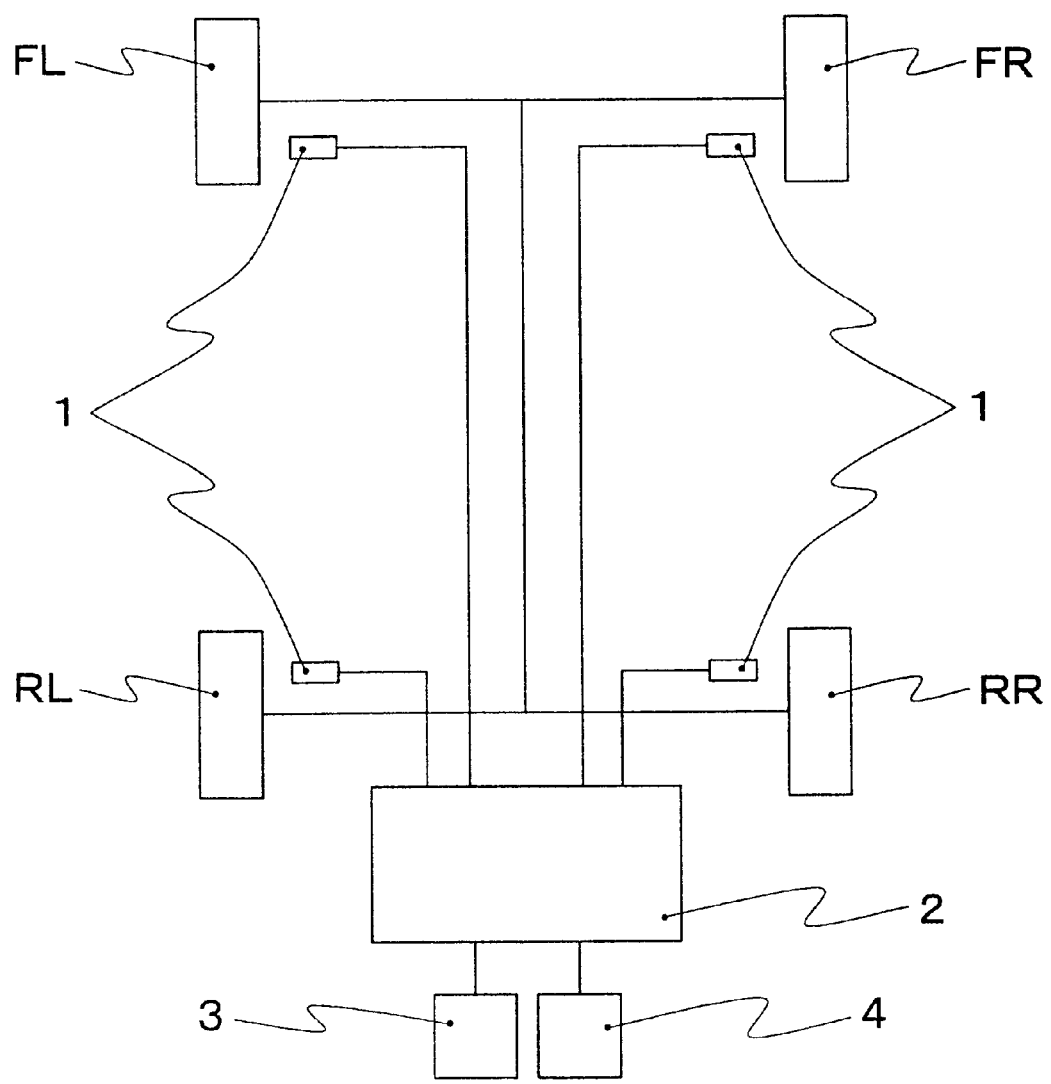
FIG. 1 is a block diagram illustrating one embodiment of the apparatus for detecting decrease in tire air-pressure according to the present invention.

As shown in FIG. 1, the apparatus for detecting decrease in tire air-pressure according to one embodiment of the present invention is for detecting whether air-pressure of any of four tires FL, FR, RL and RR (hereinafter referred to as Wi in general, wherein i=1 to 4, 1: front left tire, 2: front right tire, 3: rear left tire, 4: rear right tire) provided in a four-wheeled vehicle has decreased or not, and includes ordinary rotational information detecting means 1 respectively provided for each of the tires Wi.

The rotational information detecting means 1 might be a wheel speed sensor for measuring a wheel speed (rotational velocity) on the basis of number of pulses upon generating rotational pulses by using an electromagnetic pickup or similar or an angular velocity sensor in which power is generated through rotation such as in a dynamo, wherein the wheel speeds are measured from a voltage thereof. Outputs of the rotational information detecting means 1 are supplied to a control unit 2 which might be a computer such as an ABS. A display 3 comprising liquid crystal elements, plasma display elements or CRT for informing a tire Wi of which the tire air-pressure has decreased and an initialization switch 4 which might be operated by a driver are connected to the control unit 2.

Figure 2:
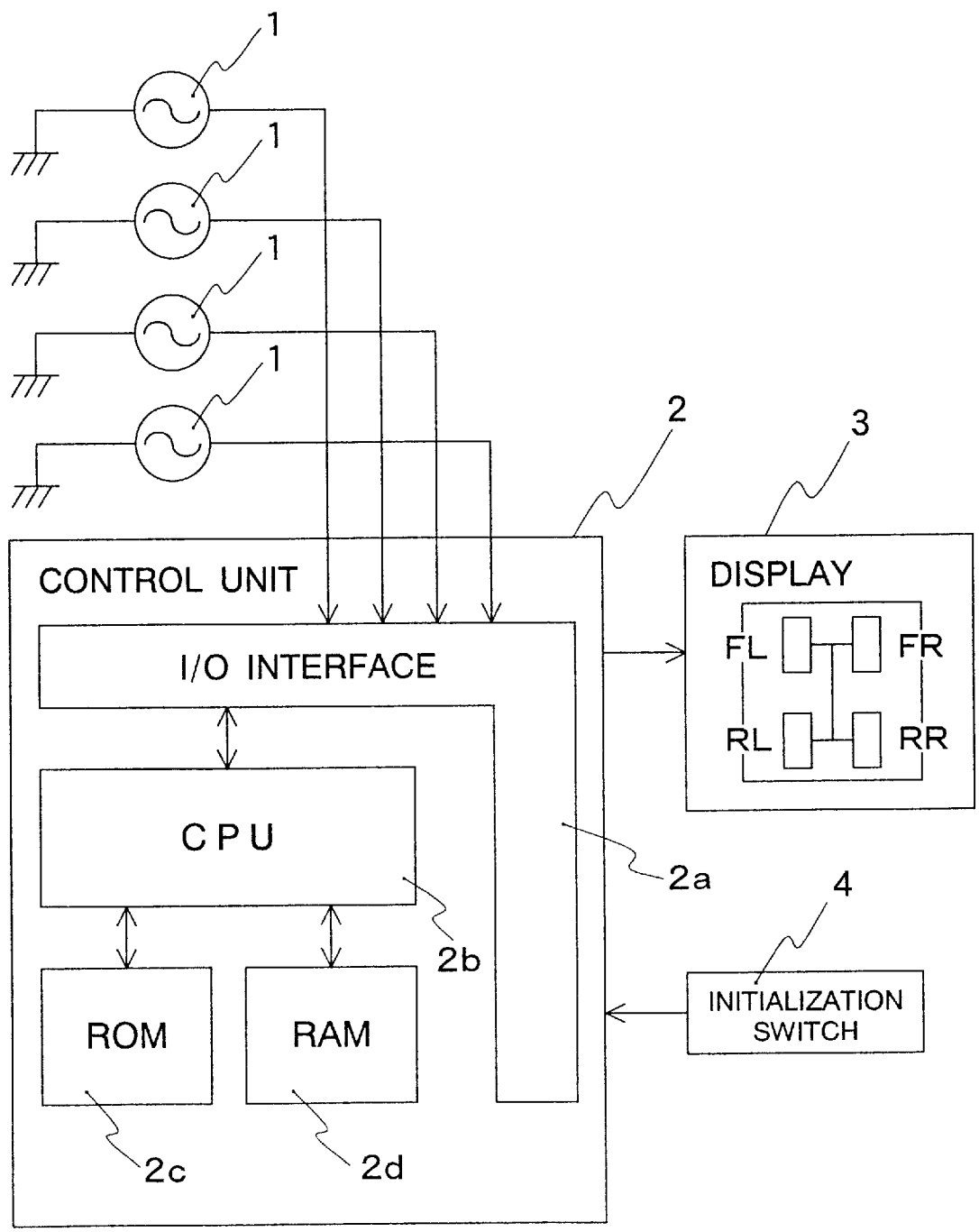
FIG. 2 is a block diagram illustrating electric arrangements of the apparatus for detecting decrease in tire air-pressure of FIG. 1.

As shown in FIG. 2, the control unit 2 comprises an I/O interface 2a required for sending/receiving signals to/from an external device, a CPU 2b which functions as a center of calculation, a ROM 2c which stores therein a control operation program for the CPU 2b, and a RAM 2d into which data are temporally written and are read out therefrom when the CPU 2b performs control operations.

Pulse signals corresponding to the rotational number of tires Wi (hereinafter referred to as "wheel speed pulses") are output from the rotational information detecting means 1. In the CPU 2b, rotational angular velocities $F_i$ for respective tires Wi are calculated on the basis of the wheel speed pulses as output from the rotational information detecting means 1 at specified sampling periods ΔT(sec), for instance, ΔT=1 second.

Since the tires Wi are manufactured to include variations (initial differences) within standards, effective rolling radii of the respective tires Wi (a value obtained by dividing a distance that has been traveled by a single rotation by 2 π) are not necessarily identical even though all of the tires Wi are at normal internal pressure. This will result in variations in the rotational angular velocities $F_i$ of the respective tires Wi. Thus, corrected rotational angular velocities $F1_i$ to cancel variations owing to initial differences are calculated. More particularly, corrections are performed to satisfy $F1_1=F_1$ $F1_2=mF_2$ $F1_3=F_3$ $F1_4=nF_4$ The correction coefficients m and n are obtained as $m=F_1/F_2$ and $n=F_3/F_4$ on the basis of rotational angular velocities $F_i$ when the rotational angular velocities $F_i$ have been calculated on the premise that the vehicle is performing straight-ahead driving. Then, wheel speeds Vi of the respective tires are calculated on the basis of $F1_i$.

When remarkable differences are found upon comparing a wheel speed of both front wheel tires and a wheel speed of both rear wheel tires when the vehicle is running on a flat road and is neither accelerating nor decelerating, it is possible to determine that either one of both front wheels or both rear wheels have simultaneously decompressed.

Accordingly, the present embodiment is provided with rotational information detecting means 1 which detect a wheel speed which is rotational information of the respective tires Wi; a rotational information storing means which stores the wheel speed of the respective tires Wi; a running condition detection means which detects whether the vehicle is running on a flat road or not; an acceleration/deceleration detection means which detects whether the vehicle is accelerating nor decelerating; a comparison means which compares rotational information of both front wheels with the wheel speed of both rear wheels when it has been determined that the vehicle is running on a flat road and that the vehicle is neither accelerating nor decelerating; and a decompression judging means which judges simultaneous decompression of both front wheel tires or simultaneous decompression of both rear wheel tires on the basis of a relationship between a value obtained through comparison of the wheel speed of both front wheels and both rear wheels and a specified threshold.

The running condition detecting means is composed of a running resistance calculating means which obtains a running resistance value on the basis of driving force, acceleration and the weight of the vehicle, and a running resistance comparing means which compares the running resistance value with a preliminarily stored running resistance value when running on a flat road.

In the program for judging decompression of a tire according to the present embodiment, the control unit 2 is made to function as the rotational information storing means which stores the wheel speed of the respective tires Wi; the running condition detection means which detects whether the vehicle is running on a flat road or not; the acceleration/deceleration detection means which detects whether the vehicle is accelerating or decelerating; the comparison means which compares the wheel speed of both front wheels with the wheel speed of both rear wheels when it has been determined that the vehicle is running on a flat road and that the vehicle is neither accelerating nor decelerating; and the decompression judging means which judges simultaneous decompression of both front wheel tires or simultaneous decompression of both rear wheel tires on the basis of a relationship between a value obtained through comparison of the wheel speed of both front wheels and both rear wheels and a specified threshold. Moreover, in the program for judging decompression of a tire, the control unit 2 is made to function as a running resistance calculating means which obtains a running resistance value on the basis of driving force, acceleration and the weight of the vehicle, and a running resistance comparing means which compares the running resistance value with a preliminarily stored running resistance value when running on a flat road.

It is possible to judge whether the vehicle is running on a flat road or not on the basis of a value of a running resistance obtained from the driving force, the acceleration and the weight m of the vehicle. More particularly, the following equation (1) comes generally true as a relationship between the driving force, the running resistance, the acceleration and the weight m of the vehicle:

$$\text{Driving force}=\text{running resistance}+m\times\text{acceleration} \quad (1)$$

Explanations will first be made of the method for obtaining the driving force.

The driving force might be obtained from a running performance curve (through pamphlets or catalogues of the vehicle) when the wheel speed (km/h) and the position of the transmission gear are known. While such a running performance curve is obtained with the throttle in a fully opened condition, similar running performance curves shall be preliminarily obtained for various degrees for opening the throttle so that it is possible to obtain the driving force also when the throttle is not fully opened. Such running performance curves are stored in the acceleration/deceleration detection means.

Next, the acceleration is obtained from a difference between the current and the wheel speed obtained one second ago when obtained from the wheel speeds of the four wheels or the average wheel speed of the following wheels. For instance, the acceleration/deceleration of the vehicle $Af_n$ is given by the following equation (2) from average wheel speed $Vf_n$ of the following wheels and average wheel speed $Vf_{n-1}$ preceding the average wheel speed $Vf_n$ of the following wheels by one.

$$Af_n = (Vf_n - Vf_{n-1})/\Delta t/g \quad (2)$$

Here, $\Delta t$ is a time interval (sampling time) between average wheel speed $Vf_n$ and $Vf_{n-1}$ of the following wheels calculated on the basis of the wheel speed data, and g is acceleration of gravity.

Thus, by substituting the obtained driving force and the acceleration into equation (1), it is possible to obtain the running resistance. The running resistance value is generally obtained by summing up a rolling resistance, air resistance and gradient resistance, and since increases/decreases in gradient resistance are present when the vehicle is running on a road other than a flat road, the running condition of the vehicle can be gained upon comparing the obtained value with a preliminarily obtained running resistance value when running on a flat road. More particularly, the running resistance is increased when running uphill while it is decreased when running downhill.

It is distinguished from the acceleration whether the vehicle is in an accelerating or decelerating condition or not. More particularly, when the vehicle is in a condition in which it is not accelerating or decelerating on a flat road, no changes that the acceleration increases or extremely reduces are found in the vehicle. It is accordingly possible to determine that the vehicle is accelerating or decelerating unless the value for the acceleration falls within a certain range. Since such a certain range for the acceleration differs from vehicle to vehicle, running is preliminarily performed on a flat road in a condition in which the vehicle is neither accelerating nor decelerating (for instance, neutral running) for determining a range. This range might, for instance, be −0.1G to −00.5G, and is preliminarily stored in the acceleration/deceleration detection means.

According to this embodiment, it is also possible to correct the judged value upon correcting the wheel speed of the driving wheels depending on the condition of incline of the road surface. More particularly, the wheel speed of the driving wheel increases the larger the inclination becomes. Thus, when the gradient is, for instance, 70%, the wheel speed of the driving wheels is divided by 1.002. Further, the wheel speed is corrected by dividing the wheel speed of the driving wheels by 1.001 when the gradient is 30%. Since such correction coefficients of 1.002 and 1.001 differ from vehicle to vehicle, they are preliminarily obtained and stored by performing running.

Figure 3:
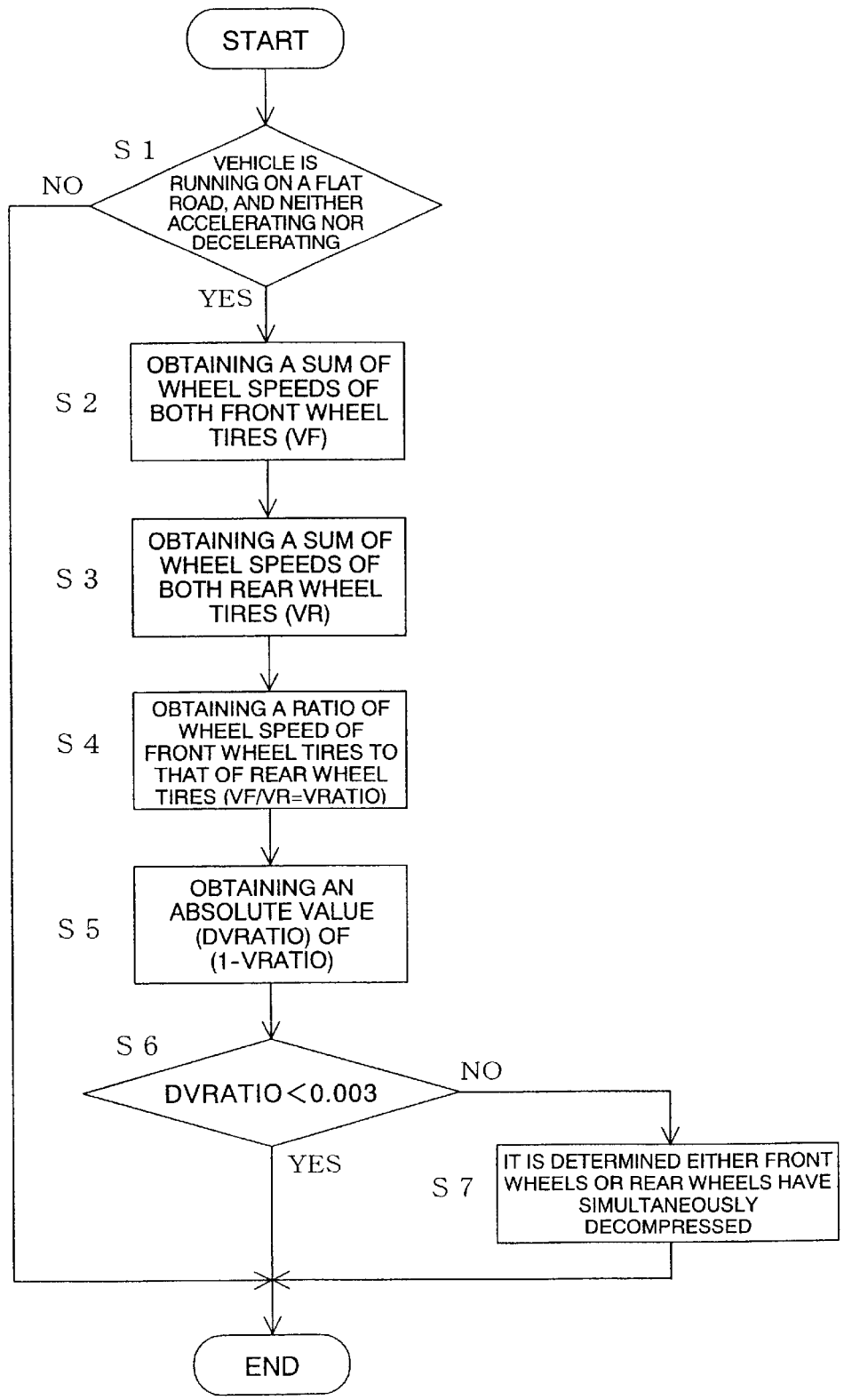
FIG. 3 is one example of a flowchart of the present invention.

Actions of the apparatus for detecting decrease in tire air-pressure according to the present embodiment will now be explained with reference to FIG. 3.

It is firstly determined that the vehicle is made to run on a flat road (condition 1) and the vehicle is neither accelerating nor decelerating (condition 2)(Step S1). When both conditions 1 and 2 are met, a sum of wheel speeds of both front wheel tires (VF) is obtained whereupon a sum of wheel speeds of both rear wheel tires (VR) is obtained (Steps S2, S3). Thereafter, a ratio of the wheel speed of both front wheel tires to that of both rear wheel tires (VL/VR) is obtained (Step S4). When this ratio is denoted as VRATIO, the VRATIO will be proximate to 1 since the wheel speed of both front wheels will normally be substantially equal to the wheel speed of both rear wheels when the tires are of normal internal pressure. In contrast thereto, when both wheels on either front or rear side are decompressed, the VRATIO will recede from 1. An absolute value of an amount of fluctuation of the wheel speed ratio with respect to 1, (1-VRATIO) will accordingly be obtained (Step S5). It is then determined whether this absolute value DVRATIO has exceeded a specified threshold of, for instance, 0.003 (Step S6), and if it is not less than 0.003, it is determined that either both front wheels or both rear wheels have simultaneously decompressed (Step S7). The threshold might be set through data obtained upon preliminarily performing running in decompressed conditions.

It should be noted that according to the present embodiment, it is possible to judge decompression of a single wheel tire while it is also possible to judge simultaneous decompression of both front wheels or simultaneous decompression of both rear wheels from among the four wheel tires for the sake of improving accuracy of judging decompression. For instance, when the threshold for judging decompression is set as a threshold for judging that both wheel tires either in the front or in the rear have simultaneously decompressed by 25%, it is possible to judge that a single tire has decompressed by 50%.

While the present invention will now be explained with reference to an example thereof, the present invention is not to be limited to such an example alone.

EXAMPLE 1

A FR (front engine/rear drive) vehicle attached with summer tires of normal internal pressure ($2.2 \times 10^5$ Pa) was provided. The tire size of the tires was 215/50R17. A running condition for the vehicle was a condition in which the vehicle was made to run on a flat road of a straight course with two persons riding thereon in which the driving condition was changed from running at 100 (km/h) to neutral driving for decelerating to 50 (km/h).

EXAMPLE 2

The vehicle was made to run under the same running conditions upon decompressing the air-pressure of the front left tire and the right front tire (both front tires) of the vehicle by 25%, respectively.

The wheel speed ratio of front and rear wheels DLR (VRATIO), the wheel speed ratio on the right-hand side and the left-hand side DFR and the wheel speed ratio DEL of diagonally located sums were obtained. The results are shown in FIGS. 4 and 5.

Figure 4:
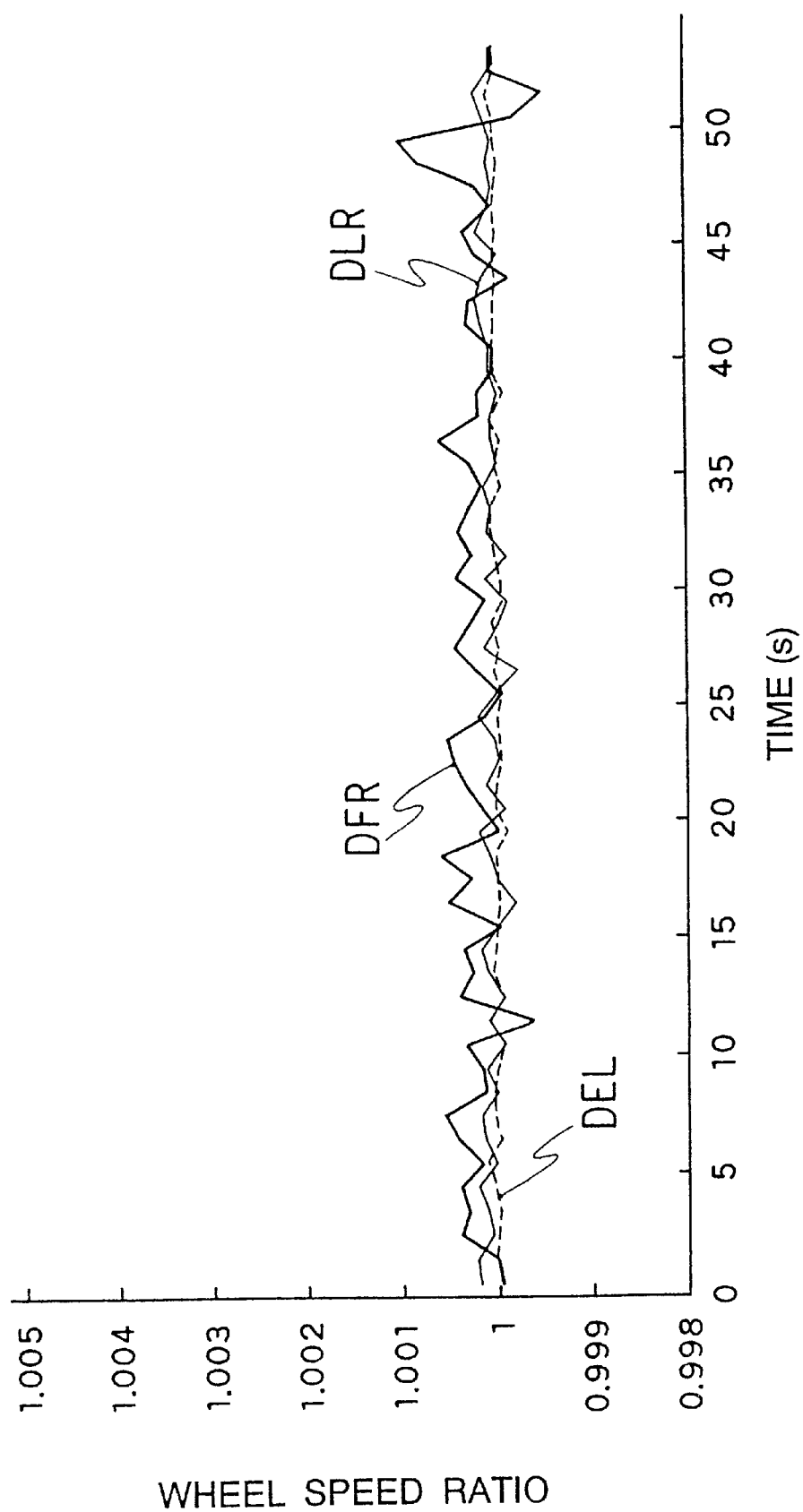
FIG. 4 is a chart illustrating a relationship between the wheel speed ratio and time when the four wheel tires are of normal internal pressure.
Figure 5:
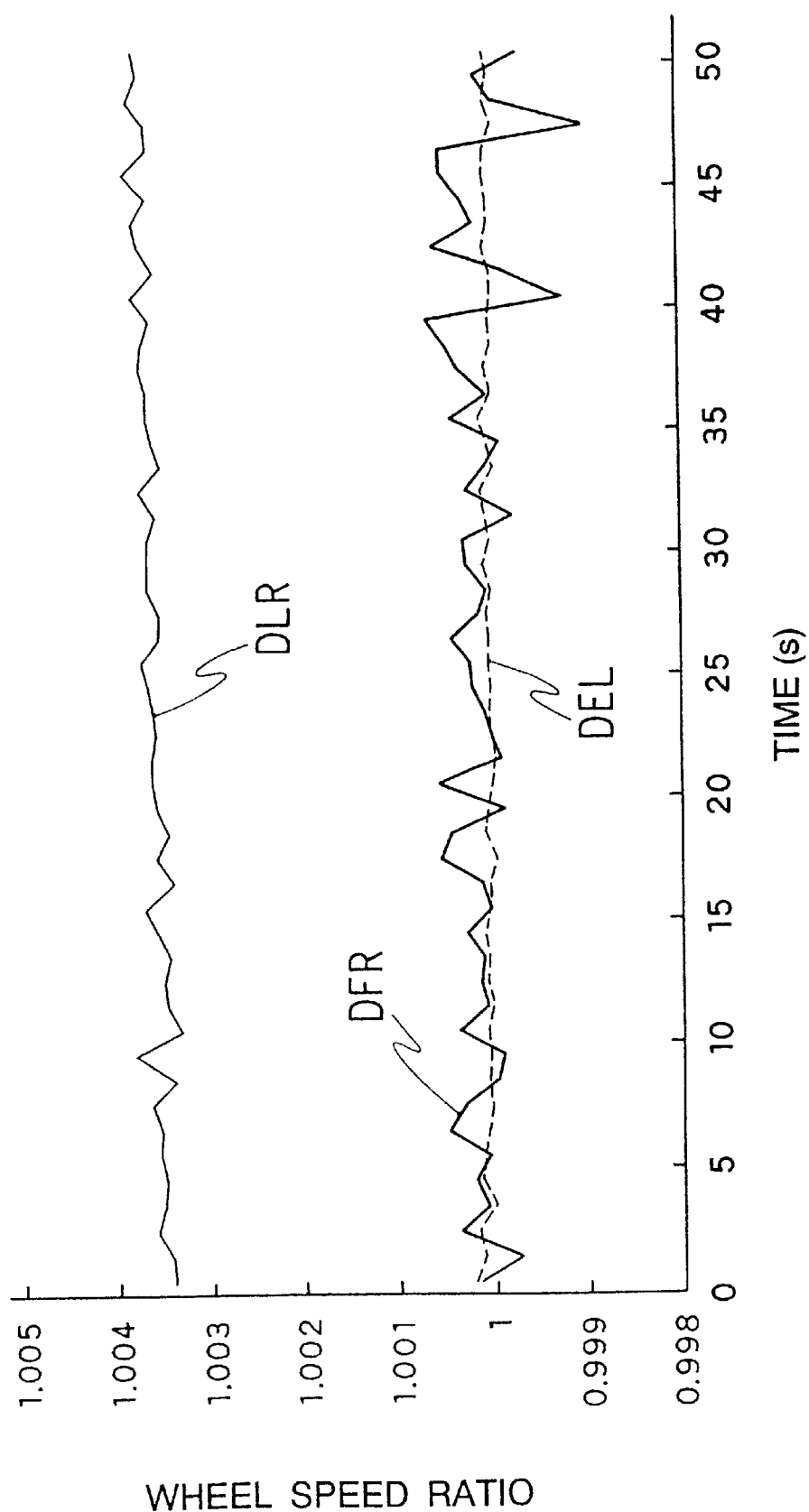
FIG. 5 is a view illustrating a relationship between the wheel speed ratio and time when both front wheel tires have been decompressed by 25%.

It can be understood from FIG. 4 that all of the DLR, DFR and DEL are proximately to 1 when at normal internal pressure. On the other hand, it can be understood from FIG. 5 that the amount of fluctuation in the wheel speed ratio of front and rear wheels DLR (VRATIO) is large, exceeding 0.003 and not less than 1.003 in average, when both front wheel tires have decompressed by 25%. With this arrangement, it is possible to judge that both front wheel tires have simultaneously decompressed.

As explained so far, it is possible to judge simultaneous decompression of both front wheel tires or both rear wheel tires when employing the present invention.

What is claimed is:

1. A method for detecting decrease in tire air-pressure, which detects decrease in internal pressure of a tire on the basis of rotational information obtained from tires attached to a vehicle, the method comprising the steps of: detecting rotational information of the respective tires; storing rotational information of the respective tires; detecting whether the vehicle is running on a flat road or not; detecting whether the vehicle is accelerating or decelerating; comparing rotational information of both front wheels with rotational information of both rear wheels when it has been determined that the vehicle is running on a flat road and that the vehicle is neither accelerating nor decelerating; and judging simultaneous decompression of both front wheel tires or simultaneous decompression of both rear wheel tires on the basis of a relationship between a value obtained through comparison of the rotational information of both front wheels and both rear wheels and a specified threshold.

2. The method of claim 1, wherein it is detected whether the vehicle is running on a flat road or not by obtaining a running resistance value on the basis of driving force, acceleration and the weight of the vehicle, and thereafter comparing resistance value with a preliminarily stored running resistance value when running on a flat road.

3. An apparatus for detecting decrease in tire air-pressure, which detects decrease in internal pressure of a tire on the basis of rotational information obtained from tires attached to a vehicle, the apparatus comprising: rotational information detecting means which detect rotational information of the respective tires; a rotational information storing means which stores the rotational information of the respective tires; a running condition detection means which detects whether the vehicle is running on a flat road or not; an acceleration/deceleration detection means which detects whether the vehicle is accelerating or decelerating; a comparison means which compares rotational information of both front wheels with rotational information of both rear wheels when it has been determined that the vehicle is running on a flat road and that the vehicle is neither accelerating nor decelerating; and a decompression judging means which judges simultaneous decompression of both front wheel tires or simultaneous decompression of both rear wheel tires on the basis of a relationship between a value obtained through comparison of the rotational information of both front wheels and both rear wheels and a specified threshold.

4. The apparatus of claim 3, wherein the running condition detecting means is composed of a running resistance calculating means which obtains a running resistance value on the basis of driving force, acceleration and the weight of the vehicle, and a running resistance comparing means which compares the running resistance value with a preliminarily stored running resistance value when running on a flat road.

5. A program for judging decompression of a tire, in which for judging decrease in tire air-pressure of a tire, a computer is made to function as a rotational information storing means which stores the rotational information of the respective tires; a running condition detection means which detects whether the vehicle is running on a flat road or not; an acceleration/deceleration detection means which detects whether the vehicle is accelerating or decelerating; a comparison means which compares rotational information of both front wheels with rotational information of both rear wheels when it has been determined that the vehicle is running on a flat road and that the vehicle is neither accelerating nor decelerating; and a decompression judging means which judges simultaneous decompression of both front wheel tires or simultaneous decompression of both rear wheel tires on the basis of a relationship between a value obtained through comparison of the rotational information of both front wheels and both rear wheels and a specified threshold.

6. The program of claim 5, wherein the computer is made to function as a running resistance calculating means which obtains a running resistance value on the basis of driving force, acceleration and the weight of the vehicle, and a running resistance comparing means which compares the running resistance value with a preliminarily stored running resistance value when running on a flat road.

* * * * *